Dec. 7, 1937.  E. A. THOMPSON  2,101,825
AUTOMATIC GEAR SHIFTING MECHANISM
Filed Oct. 9, 1923  2 Sheets-Sheet 2
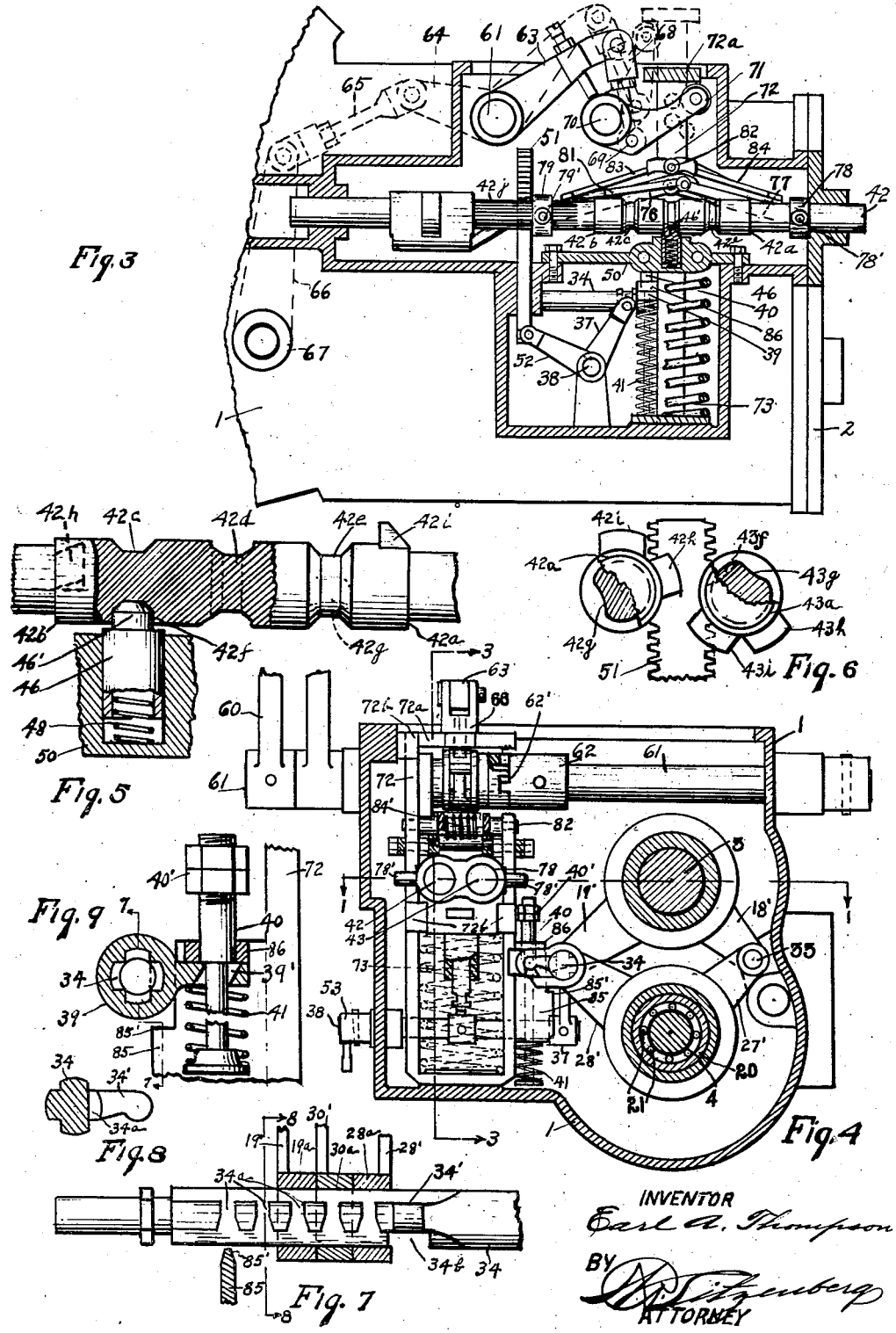
INVENTOR
Earl A. Thompson
BY
ATTORNEY Patented Dec. 7, 1937

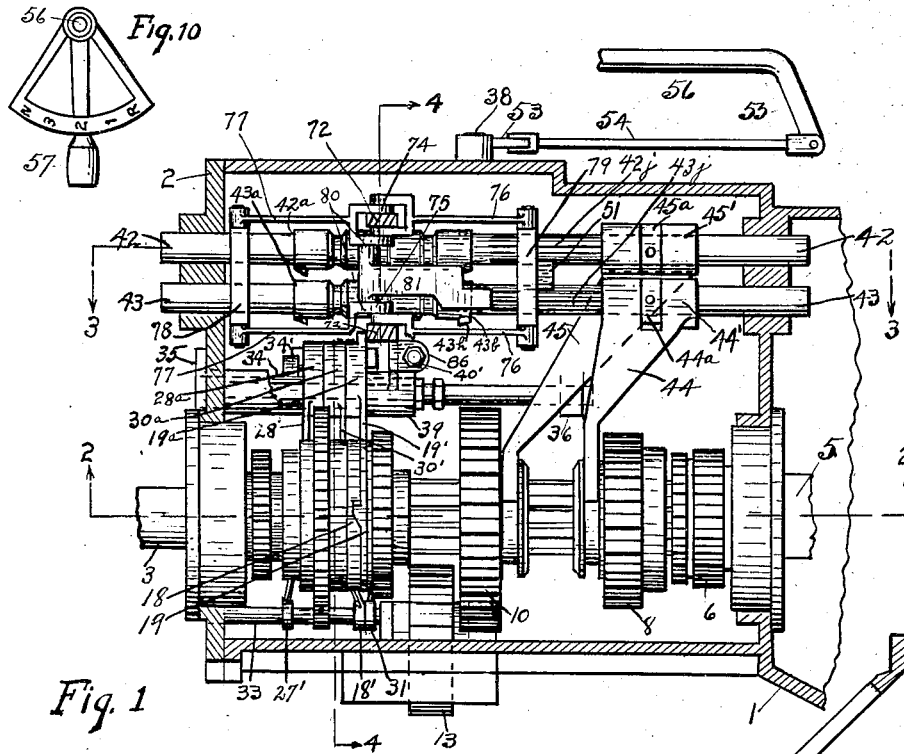

2,101,825

UNITED STATES PATENT OFFICE 2,101,825

AUTOMATIC GEAR SHIFTING MECHANISM

Earl A. Thompson, Portland, Oreg., assignor to General Motors Corporation, Detroit, Mich., a corporation of Delaware Application October 9, 1923, Serial No. 667,478

27 Claims. (Cl. 74—334)

My invention relates to gear shifting mechanism of the character shown in my United States Letters Patent No. 1,435,430, (Re. 17,090) in which I have brought together in a practical and efficient manner, in combination with the shiftable gears, the clutch and the clutch-operating member of a motor car, a mechanically operated synchronizing mechanism for synchronizing the speeds of the gears to be moved into mesh with each other, and a pre-selector mechanism for preselecting said gears.

Among the salient objects of my present invention are,—to improve and simplify the synchronizing mechanism; to improve and simplify the gear shifting mechanism; to improve and simplify the connections between the gear shifting mechanism and the synchronizing mechanism; to improve and simplify the preselecting mechanism and its connections with the gear synchronizing mechanism and with the gear shifting mechanism; to improve the construction and arrangement of the transmission case whereby said mechanisms are made easily accessible and removable; to provide in connection with the gear shifting mechanism, means whereby the shorter shift movement for the direct drive connection, commonly known as "high gear", is accomplished by the normal movement of the operating member required for moving the other gears; to provide in connection with the operating member, means for gradually increasing the leverage between said member and the clutch releasing action and the gear shifting action, as the load increases, whereby a substantially uniform pressure on said operating member will accomplish the shifting of the gears; to provide means whereby the gears in mesh with each other are locked against disengagement so long as the selector remains set for that particular speed connection; to provide means for locking the shifting mechanism so that gears can be shifted only when the selector lever is set substantially at one of the indicated operating positions; to provide means in connection with the synchronizing mechanism whereby the operating connections of said synchronizing mechanism are locked in inoperative positions, excepting as to the one selected to function, which is also locked until the actual shifting of the gears is begun; to provide means whereby the synchronizing mechanism is held in operation during the operation of changing gears until the selected transmission gears are moved partly into mesh with each other; and, in general, to greatly improve and simplify and make more definite and positive my gear shifting mechanism and its controlling devices.

I have illustrated my improvements and simplifications on the accompanying sheets of drawings, which I will now describe in detail. In the drawings, Figure 1 is a horizontal sectional view through a transmission case, at line 1—1 of Fig. 4, showing my invention embodied therein, with parts omitted for clearness;

Figure 2 is a vertical sectional view at line 2—2 of Fig. 1;

Figure 3 is a vertical sectional view at line 3—3 of Figs. 1 and 4;

Figure 4 is a vertical sectional view at line 4—4 of Fig. 1;

Figure 5 is a side elevation, partly in section, showing one of the shifter rods and a locking plunger therefor;

Figure 6 is an end view of two shifter rods, with operating rack and lugs in their relative positions;

Figure 7 is a side elevation of a cam shaft, with parts in section on line 7—7 of Fig. 9;

Figure 8 is a sectional view through the cam shaft at line 8—8 of Fig. 7;

Figure 9 is a view showing the cam shaft in end elevation with related parts, partly in section; and Figure 10 is a view of a selector lever and quadrant therefor.

Referring now in detail to the drawings, the transmission case 1 is provided at its rear end with a removable bearing closure plate 2, whereby when said plate is removed, practically the entire mechanism can be withdrawn from the case. The drive shaft 3, the counter shaft 4 and surrounding cluster gear sleeve 20, the clutch shaft 5, together with the usual transmission gears 6 and 7, 8 and 9, 10 and 11, and 12 and 13, are all old and their construction and arrangement well understood.

I will first describe my improved synchronizing mechanism in connection with said transmission gears, referring especially to Figs. 1, 2 and 4.

Mounted on the drive shaft 3, to turn therewith, are a gear 14 and a gear 15, with a cone bearing and clutch member 16, therebetween, and on which cone bearing and clutch member 16 are slidably and revolubly mounted a gear 17. Mounted around the cone member 16, between the gears 15 and 17 are two cam-faced clutch crowder or clutch actuating elements, 18 and 19, respectively, each having an arm, as 18' and 19'. Mounted on the counter shaft 4, which is stationary, is a sleeve 20, which is shown as an integral extension from the gear cluster 7, 9, 11 and 12 on the same shaft, above referred to. Roller bearings, 21, are shown between said counter shaft 4 and said sleeve 20. Mounted on said sleeve 20, to turn therewith, are cone bearings 22 and 23, with a gear 24 therebetween. Revolubly and slidably mounted on the cone bearing 22, is a gear 25, continuously in mesh with gear 14, on the drive shaft 3. The gear 24, is continuously in mesh with gear 17. Revolubly and slidably mounted on cone bearing 23 is a gear 26, which is continuously in mesh with gear 15. Cam clutch actuating elements 27 and 28 are mounted between gears 24 and 25, with a thrust washer 29, next to gear 24. Said clutch actuating elements 27 and 28 are provided with arms 27' and 28'. Similar clutch actuating elements 30 and 31 are mounted between gears 24 and 26, with thrust washer 32, next to gear 24. Said clutch actuating elements have arms 30' and 31'.

Inasmuch as the movable cam-faced, clutch-actuating elements 28 and 30 are always substantially in contact with the respective reaction thrust receiving washers 29 and 32 which in turn react against the intermediate gear 24, it will be apparent that when one of said actuating elements is rotated initially to crowd the gear 25 or 26, as the case may be, toward the larger end of cone bearing 22 or 23, the reaction thrust is transmitted through said thrust receiving washer 29 or 32 to the gear 24, thus increasing the friction between gear 24, the washer receiving the thrust, and between the latter and the cooperating movable clutch actuating element. The gear 24, which is fixed to sleeve 22 and rotates at all times when the vehicle is being driven by the engine, thus tends to rotate the movable clutch actuating element being initially rotated, adding to the force initially applied to rotate said element a force derived from the rotation of the gearing, which assists in crowding the friction clutch surfaces into stronger frictional engagement.

The three sets of gears just described and which constitute the principal part of the synchronizing device, correspond substantially but not exactly in ratio to the respective transmission forward speed gears. The cam clutch actuating elements 18, 27 and 31, are held stationary by their arms 18', 27' and 31', which are connected to a fixed pin 33, in the transmission case. The clutch actuating elements 19, 20 and 30 have their arms 19', 28' and 30' connected to the cam shaft 34, by means of loops or heads, 19a, 28a and 30a, and by which said spiral clutch actuating elements can be rotated or rocked in a manner hereinafter described. Said cam shaft 34 is movable longitudinally through bearings 35 and 36, and also through the loops 19a, 28a and 30a, of the clutch actuating elements 19', 28' and 30', by means of an arm 37, connected to and operated by the shaft 38. Said cam shaft 34 is also mounted to rock in said bearings 35 and 36. This rocking action is accomplished by means of an arm 39, mounted on said cam shaft 34, so that the shaft can be moved longitudinally through the arm, as indicated by the construction shown in Figs. 7, 8 and 9. Said arm 39 is provided at its outer end with slotted opening 39', through which operates a stem or pin 40, having a spiral spring 41 for yieldingly connecting said pin 40 to said arm 39, as indicated in Fig. 9. Said cam shaft 34 is provided with a cam finger 34', adapted, as said cam shaft is moved longitudinally, to be moved into operative relationship within any of said loops 19a, 28a or 30a, for the purpose of moving the arms 19', 28' or 30', and operating the clutch actuating elements, as may be desired, to connect the proper gears of the synchronizing device, through their cone clutches, to the shaft 3 and sleeve 20 to impart the desired speed to the corresponding gears of the transmission proper, thus making it possible for said gears to be moved into mesh without gear clash. Said cam shaft 34 is provided beneath the cam finger 34', with a notch 34b, Fig. 7, to permit the proper loop 19a, 28a, or 30a, to be raised by said cam finger 34', when the cam shaft is rotated or rocked. The synchronizing device is in fact a co-operating gear set with cone clutch control for each speed combination.

I will next describe the gear shifting mechanism, whereby the transmission gears are shifted into and out of mesh with each other. Slidably and revolubly mounted through the transmission case 1 are two shifter rods, 43 and 42, to which are connected respectively two shifter forks 44 and 45, connected with the transmission gears 8 and 10, respectively, as indicated in Fig. 1. Said forks 44 and 45 are mounted on said rods so as to permit the rods to be revolved in the hub portions 44' and 45' of said forks and at the same time move said forks when said rods are moved longitudinally. Collars 44a and 45a are shown secured to said rods as one practical way of accomplishing this connection. Said shifter rods 42 and 43, have enlarged portions to provide the shoulders 42a, 42b, and 43a and 43b, Figs. 1 and 5, and the annular channels 42c, 42d, 42e, and corresponding annular channels in shifter rod 43, the channels 42c and 42e, and corresponding channels in shifter rod 43 having formed therein at different circumferential positions, deeper plunger-receiving sockets, as 42f and 42g, and 43f and 43g, to receive the ends of two plunger members, as 46, having tapered ends, as 46', formed to fit said annular channels, or to pass into said sockets, in order to lock said shifter rods against movement longitudinally, as indicated in Fig. 5, where the plunger 46 is shown in locked position. Said rods, are not, however, locked against rotation. Said plungers 46 are spring pressed by the springs, as 48, substantially in the manner indicated in said Fig. 5, and are mounted in a bridge member 50. Formed on each of said shifter rods 42 and 43, are two shifter lugs, 42h and 42i, and 43h and 43i, said lugs being positioned at the diametrically opposite sides of the shifter rod from the position of the corresponding plunger-receiving sockets. Said shifter rods 42 and 43 also have formed therein longitudinally extending gear teeth, as 42j and 43j, to receive a rack bar 51, having teeth on its opposite sides, whereby when it is moved vertically, or longitudinally, said shifter rods are rotated or rocked to position one of the shifter lugs, 42h, 42i, 43h or 43i, uppermost in operative position. Said shifter lugs are so positioned on said shifter rods relative to each other that only one of said lugs can be moved to the uppermost, or operative position at one time. This will be understood by reference to Fig. 6, where both shifter rods are shown in end elevation in order to show the relative positions of the four shifter lugs.

The middle annular channels on said shifter rods have locking plunger-receiving sockets as shown at 42d on rod 42 (Fig. 5) extending around the entire circumference of said rods, except that the locking shoulder is cut away diametrically opposite the lugs 42h, 42i, and 43h, 43i, for the purpose of allowing said rods to be shifted only when one of said lugs is turned to its uppermost position and then only in the direction which said lug will be moved by its operating toggle, as indicated in Fig. 5 with respect to rod 42. This construction and arrangement operates to positively lock the gears in the neutral positions, releasing only the one selected to be shifted.

The rack bar 51 is pivotally connected at its lower end to an arm 52, mounted on shaft 38. On the outer end of said shaft 38, outside of the transmission case, is an arm 53, with which is connected a link 54, the other end of which link is connected to an operating lever 55, on the lower end of a rod 56, which is extended to the selector lever 57, similar to that shown in my prior patent. Thus the movement of the selector lever 57, operates through the connections described to move the rack bar 51 and turn the shifter rods, 42 and 43, to the desired positions. This operation, through the movement of the shaft 38, also moves the lever 37 and shifts the cam shaft 34, as previously described.

I will next describe the gear shifting mechanism by means of which the selected gears are shifted. The clutch lever is designated 60, on a rock shaft 61, in the transmission case 1. On said rock shaft 61, is secured a collar 62 having a jaw clutch connection at 62' with a lever 63, said jaw clutch connection having sufficient lost motion to allow the main engine clutch to be disengaged by the initial movement of the clutch lever, or pedal, 60, through the lever 64, link 65, and lever 66, to the clutch rock shaft 67, which operates said main clutch. The further movement of the clutch pedal 60, and the rock shaft 61, engages the jaw clutch elements and operates to raise lever 63, Fig. 3, which operates through the link 68, connected to a lever 69, mounted on the stationary stud 70, to raise said lever 69, the outer end of which is provided with a roller, 71, which bears against the upper end 72a of a shifting frame 72, moving in suitable guide bearings 72b, 72b. Said shifting frame is of rectangular form and is shown clearly in Figs. 1 and 4. Said frame is normally and yieldingly held in its lowermost position by means of coiled spring 73, which bears upon the bottom part of said frame and at its upper end said spring bears against the underside of the bridge 50.

Pivotally connected to the side members of said shifting frame, as at 74 and 75, are four links 76—76 and 77—77, said links being pivotally connected at their outer ends to slide members 78 and 79, as at 78' and 79' slidably mounted on the opposite ends of the shifter rods 42 and 43, as shown in Figs. 1 and 3. This connection operates, when the shifting frame 72 is raised, to move the slide members 78 and 79 toward each other and into engagement with the enlargements 42a, 43a or 42b, 43b, so as to shift the gears to neutral position, in case they are not already in that position moving the shifter rods 42 and 43 to their middle positions, as shown in Fig. 3, with the holding plungers 46, in position in the middle annular channels. Pivotally connected between the links 77—77, Fig. 1, at 80, is a toggle member 81, the free end of which slides upon the top of shifter rod 43, and is adapted to engage the lug 43h, when said lug is turned to its uppermost or operating position. This toggle member operates to move the shifter rod 43, as the shifting frame moves downwardly. The pivotal connection 80 of this toggle member 81, is at one side of the pivotal connections 74—75, and this connection provides a shorter shift movement for the direct drive connection, or high gear, than is required for the shifting movement of the other gears. This shorter shift movement results from the fact that when the shifting frame 72 is raised, pivotal axis 74—75, moves upwardly therewith, while the pivotal axis 80 swings under the same, as indicated in light dotted circles in Fig. 3, thus producing a differential action between said axis 80 and axis 74—75.

Also pivotally connected to said shifting frame 72, as at 82, and above the axis 74—75, are two toggle members 83 and 84. The outer end of toggle member 83 slides upon the top of shifter rod 42, in position to engage its lug 42h, as said shifter frame 72 moves downwardly. This moves said shifter rod 42 and its connections to establish low gear drive. The outer end of the toggle member 84 is broad enough to rest upon both of the shifter rods 42 and 43, and to slide thereupon for the purpose of engaging either of the lugs 42i or 43i, as said shifter frame moves downwardly, and thus to move either the shifter rod 42 to engage reverse gear, or the shifter rod 43, to engage the intermediate gear. Said toggles 83 and 84 are normally and yieldingly held down upon the shifter rods by a coiled spring 84'.

At one side of said shifter frame 72, is an extension 85 therefrom, of flat form, having a shoulder 85', Figs. 4, 7 and 9. The upper end of said extension is provided with an angle portion 86, through which the stem 40 slides, Figs. 9 and 4. When the shifter frame 72 is raised by the depression of the clutch lever 60, the angle portion 86, of the extension 85, moves upwardly on the stem 40, until it engages with nuts 40', at the upper end of the pin or stem 40, for the purpose of rocking the cam shaft 34, through the arm 39, and spring 41. When said shifting frame 72 returns, the angle portion 86 of the extension 85, will strike the top of the arm 39 and rock the cam shaft 34 back to its normal position and it holds the cam shaft finger 34' in register with the loops, 19a, 28a and 30a, on the arms of the clutch actuating cams. Referring to Figs. 7 and 9, it will be seen that the extension 85 must pass through one of several notches, 34a, in the cam shaft 34, to permit said frame and said extension 85 to be raised. Unless the cam shaft finger 34' is properly positioned, said extension shoulder 85' cannot pass into said notches. This prevents a shift of gears until the cam shaft has been properly positioned.

If said shaft is only slightly out of position, the extension shoulder 85' will operate to shift the cam shaft to its proper location by reason of the beveled edges, as shown in Fig. 7. When said cam shaft 34 is not accurately positioned by the selector lever 57, and its connections thereto, the beveled edges of the extension shoulder 85', against either side of the notches 34a, will not only shift said cam shaft to its proper position, but will also rotate the shifter rods 42 and 43 so that proper lug 42h, 42i, 43h, or 43i, will be moved to its uppermost position.

The use and operation of my invention may be briefly described as follows:

It will be understood from the foregoing that the actual shifting of the gears is accomplished by the clutch pedal or lever. The selection of the gears to be moved into mesh is made by shifting the selector lever 57, to the desired position on the quadrant, as shown in Fig. 10. By moving said selector lever 57 to the desired speed selection, the shaft 56 is rotated and through the connections 55, 54, and 53, the shaft 38 is rotated. The rotation of said shaft 38 operates through the arm 37 to shift the cam shaft 34 longitudinally to position the cam finger 34', which may be moved from the neutral position, as shown in Fig. 7, into any one of the loops, 19a, 30a, or 28a, or to a position beyond said loops, corresponding to reverse drive position. The rotation of said shaft 38 also operates the arm 52, moving the rack bar 51, which operates to rotate the shifter rods 42 and 43, for the purpose of positioning the desired lug, 42h, 42i, 43h, or 43i, to the uppermost or operative position. This completes the selection and it is all accomplished by the simple movement of the selector lever 57 to the desired position.

The initial depression of the clutch pedal or lever 60 operates to disengage the main clutch through the operation of the shaft 61, the lever 64, link connection 65, lever 66, and the clutch rock shaft 67. The further depression of said clutch pedal operates through a jaw clutch 62, the lever 63, link connection 68, and lever 69, to raise the shifting frame 72. From this showing it will be noted that as the center at 69 moves upwardly around the fulcrum at 70 to the dotted line position, Fig. 3, the roller 71, moves inwardly across the underside of the top 72a of the frame 72. This gradually increases the leverage from the lever 63, to the lifting roller 71, on the frame 72. It will also be understood that as the lever 64, is moved downwardly its pivotal connection 64' with the link 65, moves into alinement with 61 and 66', thus, by a toggle action, gradually increasing the leverage on the main clutch spring. As the shifting frame 72 is thus moved upwardly, the shifting links 76, 76 and 77, 77, through their slide members 78 and 79, operate to center or neutralize said shifter rods 42 and 43. If any gears are in mesh, this movement disengages them. The final upward movement of the shifting frame 72, moves the angle portion 86, of the extension 85, up against the nuts 40', lifting the rod or stem 40 and rocking the cam shaft 34.

Assuming that the cam shaft 34 has been shifted longitudinally to position the cam finger 34' in one of the loops 19a, 30a, or 28a, the rocking of said cam shaft 34, operates through the connecting arms 19', 30' or 28', to engage the corresponding cone clutch and thus set into operation the synchronizing device. Thus with the full depression of the clutch pedal or lever, I have disengaged the main clutch, disengaged any of the shiftable transmission gears which were in mesh, and synchronized the selected gears which are to be moved into mesh. As the clutch pedal or lever is returned on its upward movement, it operates through one of the toggle members 81, 83, or 84, to move the selected and synchronized gears into mesh by shifting one of the shifter rods 42 or 43, which is connected through the forks 44 or 45 to the shiftable gears 8 or 10, as the case may be. The final return movement of the clutch pedal engages the main clutch and the complete shift has been made.

Thus I have provided a positive mechanically operated synchronizing mechanism, operated from the rear axle, and which is set into operation by the downward disengaging movement of the clutch pedal or lever, and while I have shown and described one practical embodiment of my invention, in order to explain the same, I am aware that many changes in details can be made without departing from the spirit of the invention, and I do not, therefore, limit it to the showing made, except as I may be limited by the hereto appended claims.

I claim:

1. The combination with a power transmission including a pair of main shafts, gears on said shafts adapted to establish a drive between the shafts, means including a control lever for connecting and disconnecting said drive, of synchronizing means for establishing the desired speed relation between the main shafts before they are placed in driving relation, said synchronizing means comprising a conical member, a member normally freely rotatable on the conical member, and leverage multiplying means to produce engagement between the conical member and the normally freely rotatable member during the synchronizing period.

2. The combination with a power transmission including a pair of main shafts, gears on said shafts adapted to establish a drive between the shafts, means for connecting and disconnecting said drive, of synchronizing means adapted to establish the desired speed relation between the main shafts before they are placed in driving relation, said synchronizing means comprising a conical member, a member normally freely rotatable on said conical member, and spiral actuating elements adapted to produce engagement between the conical member and the normally freely rotatable member.

3. The combination with a power transmission including a pair of main shafts, gears on said shafts adapted to establish a drive between the shafts, means for connecting and disconnecting said drive, of synchronizing means adapted to establish the desired speed relation between the main shafts before they are placed in driving relation, said synchronizing means comprising a pair of gears mounted on the main shafts, and permanently in mesh, a conical member on which one of said gears is normally freely rotatable, and means for engaging the normally freely rotatable gear with the conical member.

4. The combination with a power transmission including a pair of main shafts, gears on said shafts adapted to establish a drive between the shafts, means for connecting and disconnecting said drive, of synchronizing means adapted to establish the desired speed relation between the main shafts before they are placed in driving relation, said synchronizing means comprising a pair of gears mounted on the main shafts, and permanently in mesh, a conical member relative to which one of said gears is normally freely rotatable, and cam-faced actuating elements for engaging the normally freely rotatable gear and the conical member.

5. In gear transmission mechanism, in combination, two parallel shafts, gears thereon to be moved into and out of mesh with each other, means for preselecting the gears to be moved into mesh, and means for synchronizing the speeds of the gears to be moved into mesh, said synchronizing means being set for action by the means for preselecting the gears to be moved into mesh and including a corresponding set of gears in constant mesh with each other, combination cone bearings and clutch means connecting said gears to the said parallel shafts, and cam-faced crowder means for engaging said cone bearings and said gears to drive the latter.

6. In gear transmission mechanism, in combination with the shafts, gears thereon to be moved into mesh with each other, and means for shifting said gears, of means for preselecting the gears to be moved into mesh with each other, a synchronizing mechanism to synchronize the speeds of the gears to be moved into mesh and comprising a cooperating set of gears on said shafts in constant mesh with each other, cone bearings and clutch means connecting said gears to said shafts, cam-faced clutch actuating elements to effect a relative movement between said cone bearings and said gears to drive said gears and said shafts, means for selectively operating said clutch actuating elements and means for rendering accurate the operation of said clutch actuating elements, substantially as described.

7. In a gear transmission mechanism, in combination with shafts, gears thereon to be shifted into and out of mesh with each other, and a shifting lever having connections for shifting said gears, of means for preselecting the gears to be moved into mesh, said means comprising two parallel shafts operatively connected with said gears, a selector element, connections thereto for rocking said parallel shafts about their axes, engaging parts on said shafts for moving the same to move said gears, connections from said shifting lever and operated thereby for moving said shafts by engaging said engaging parts, and yielding locking means for holding said parallel shafts in different positions of adjustment.

8. In a gear transmission mechanism, in combination, gear shafts, gears thereon to be shifted, a lever for shifting said gears, means for preselecting the gears to be shifted, said means comprising two parallel shafts operatively connected with said gears, a selector lever to be moved to the desired selector position, connections from said selector lever to said parallel shafts for rotating the same to different positions, lugs thereon adapted to be turned therewith to different operative positions, members to be moved to engage with said lugs to shift said parallel shafts, connections from said members to the lever for shifting said gears, spring pressed plungers for yieldingly holding said parallel shafts in adjusted positions longitudinally, and means whereby said plungers will engage and lock said parallel shafts in different operative positions, substantially as described.

9. In a gear transmission, in combination, gears to be shifted, a lever for shifting the same, means for preselecting the gears to be shifted comprising a selector lever, a shifting member connected with said gears for moving the same, connections from said selector lever for rotating said shifting member to different positions about its axis, means for yieldingly holding said shifting member in different positions of adjustment, engaging parts on said shifting member to be engaged for moving the same and said gears with which it is connected, and a member operated from the lever for shifting said gears adapted to engage said engaging parts for moving said shifting members and said gears.

10. In a gear transmission mechanism, in combination, gears to be shifted, a foot pedal for shifting said gears, a preselecting device for preselecting the gears to be moved, a synchronizing mechanism for synchronizing the speeds of the gears to be moved into mesh with each other, said synchronizing mechanism including a corresponding set of gears of substantially the same ratio and constantly in mesh with each other, clutch means for selectively driving said corresponding set of gears, connections from said preselecting device for preselecting the clutch means, and operative connections from the foot pedal for shifting the gears to neutral positions, operating the selected clutch mechanism to actuate the synchronizing mechanism and shifting the selected and synchronized gears into mesh with each other by the down and up movement of said foot pedal.

11. In a gear transmission mechanism, in combination, gears to be shifted, a main clutch, a main clutch pedal, a preselecting device for preselecting the gears to be moved into mesh with each other, including a selector lever, a shift rod connected with said gears, engaging parts on said shift rod to be engaged for moving said shift rod, connections from said selector lever for positioning said engaging parts, an operating member operable from said main clutch pedal for engaging and moving said shift rod and said gears, and means for yieldingly holding said shift rod in different adjusted positions.

12. In a gear transmission device, in combination, two parallel shafts, gears thereon adapted to be moved into and out of mesh with each other, means for shifting said gears, said means including two horizontally movable members, a vertically movable member, shifting levers pivotally carried by said vertically movable member and operating at their outer ends on said horizontally movable members to move the same as said vertically movable member moves in one direction, and means for yieldingly holding said horizontally movable members in different positions of adjustment, said means comprising spring pressed plungers operating against said members, substantially as described.

13. In a gear transmission mechanism, means for shifting the gears into and out of mesh with each other, said means including in combination two rods movable horizontally and connected with said gears, a member movable vertically, shifting members pivotally connected to said vertically movable member at one end and at their other ends slidably connected to said rods to move them in one direction, other shifting members pivotally connected to said vertically movable member with their ends resting upon said rods and adapted to engage and move them to move the gears into mesh with each other, and spring means normally holding said shifting members down upon said rods and other spring means yieldingly holding said rods in adjusted positions.

14. In a gear transmission device, in combination with gears to be shifted into and out of mesh with each other, of means for shifting said gears including two shift rods, a shift frame, two shift members pivotally connected at their opposite ends to said shift frame and slidably connected to said rods, other shift members pivotally connected to said shift frame and at their free ends moving upon said shift rods, engaging parts on said rods to be engaged by said shift members for moving said rods, means for selectively positioning said engaging parts in operative positions, and means for yieldingly holding said rods and said engaging parts in adjusted positions, said means being adapted to lock said rods in certain operating positions when so adjusted.

15. In a gear transmission mechanism, in combination, gears to be shifted into and out of mesh with each other, a lever for shifting them, a preselector device for determining the gears to be shifted into mesh, a synchronizing device for synchronizing the speeds of the selected gears, said synchronizing device including a corresponding set of gears in constant mesh with each other, clutch means for selectively driving the said corresponding set of gears, a member adjustable to different positions for selecting the clutch means to be actuated, said member being adjusted by the preselector device, and connections from the lever for shifting the gears and said adjustable member for moving the same to actuate the clutch means, substantially as described.

16. In a gear transmission mechanism, in combination with gears to be moved into and out of mesh with each other and a lever for moving said gears, a preselector device including a member adapted to be rotated and shifted longitudinally and connected with a gear to be moved, a preselector lever connected to rotate said member, means yieldingly holding said member in its adjusted positions, said means being adapted to lock said member in each operating position, and connections from the lever for moving the gears and shifting said preselector member and its gear.

17. In a power transmission, the combination of a clutch and transmission gears adapted to be moved into and out of mesh with each other, an operating element for releasing said clutch and shifting said gears and means for gradually increasing the mechanical advantage gained by said operating element acting on said clutch and transmission gears whereby an approximately uniform pressure on said operating element will release said clutch and shift said gears.

18. In a power transmission, the combination of a clutch and transmission gears adapted to be moved into and out of mesh with each other, an operating lever for releasing said clutch and shifting said gears and means for gradually increasing the leverage of said operating lever for releasing said clutch and shifting said gears as said operating element is moved.

19. A power transmission including a pair of shafts, gears on said shafts adapted for establishing various speed ratios between the shafts, synchronizing means for controlling the speeds of the gears, said synchronizing means including a clutch, a pair of coaxial crowder members adapted to be rotated one relative to the other for operating the clutch, and means including a spring device for effecting the relative movement of said members.

20. A power transmission including a pair of shafts, gears on said shafts adapted for establishing various speed ratios between the shafts, synchronizing means for controlling the speeds of the gears, said synchronizing means including a pair of movable members and a spring device for effecting synchronization, means for actuating the synchronizing means and establishing a driving relation between the shafts, and means whereby the actuating means returns the relatively movable members to normal position independently of the spring device.

21. The combination in a power transmission including a pair of shafts, gears on said shafts adapted to establish a drive between the shafts, means including an axially shiftable member for connecting and disconnecting said drive, of synchronizing means for establishing the desired speed relation between the shafts before the drive is connected, said synchronizing means comprising a friction clutch and means for effecting thrust against said clutch to cause its frictional engagement, said means consisting of coaxial cam-faced clutch actuating rings surrounding the clutch axis, and means for operating the shiftable member and one of said clutch actuating rings.

22. In power transmitting mechanism including rotary input and output members, engageable and disengageable positive power transmitting elements to operatively couple or uncouple said input and output members; means including friction clutch elements for coupling said members, relatively rotatable cam-faced actuators coaxial with said friction clutch elements and arranged to transmit axial force thereto and to effect engagement thereof during relative rotation in one sense and to permit disengagement of said friction clutch elements during relative rotation in the opposite sense; control means comprising means to initiate relative rotation of said actuators and thereby cause engagement and disengagement of the friction clutch, and means for causing engagement of said positive power transmitting elements during disengagement of the friction clutch.

23. In power transmitting mechanism including power input and output members, engageable and disengageable positive power transmitting elements adapted to operatively couple or uncouple said input and output members; means including friction clutch elements for frictionally coupling said members; relatively rotatable cam-faced actuators coaxial with said friction clutch elements and arranged to transmit axial force thereto and to effect engagement thereof during relative rotation in one sense and to permit disengagement of said friction clutch elements during relative rotation in the opposite sense; control means including a member capable of a reciprocative motion, means connected to said reciprocative member for initiating, during the first half of the reciprocating movement, relative rotation of said cam-faced actuators and thereby effecting initial engagement of said friction clutch elements, means connected to said reciprocative member for rotating said cam-faced actuators reversely and releasing the friction clutch elements at the beginning of the second half of the reciprocating movement, and other means connected to said reciprocative member to effect engagement of the positive power transmitting elements during the latter part of said second half of its reciprocative movement.

24. In a variable speed power transmission mechanism including power input and power output members, different ratio gear trains arranged to transmit power from the input to the output member including axially movable toothed coupling elements adapted to selectively couple or uncouple said trains, one of said coupling elements having a shorter coupling movement than another; a shifting means for effecting engagement and disengagement of the axially movable coupling elements, said shifting means comprising a shifting member having a uniform amplitude of movement and devices actuated by said shifting member having differential movements imparted by the uniform movement of said shifting member to transmit movements of the amplitude appropriate to the several toothed coupling elements.

25. In a variable speed power transmission mechanism including power input and power output members, different ratio gear trains arranged to transmit power from the input to the output member including axially movable toothed coupling elements adapted to selectively couple or uncouple said trains, one of said coupling elements having a shorter coupling movement than another; shifting means engageable with each coupling element and means for actuating said shifting means, including a shifting member having a uniform amplitude of movement transverse of the axes of said coupling elements, toggle link mechanism pivoted to said shifting member for imparting movement to said couplings, and a differential toggle link pivoted to said toggle link mechanism at one side of the pivotal connection of the latter for imparting movement to said coupling that has the shorter amplitude of coupling movement.

26. The combination of a pair of positive power transmitting elements adapted to be mutually engaged in order to drive one from the other, and means for causing engagement and disengagement thereof; a synchronizing means for causing said positive power transmitting elements to approach the same speed prior to their mutual engagement; a control means responsive to a relatively light force for causing the synchronizer to begin to function; means actuated by the force exerted by one of the rotating positive power transmitting elements about to be engaged for causing the synchronizing means to complete the synchronization of said elements, and means responsive to the operation of said means for causing engagement of the positive power transmitting elements to cause the synchronizer to become inoperative.

27. In power transmitting mechanism the combination of two independently rotatable members adapted to be coupled in power transmitting relation; interengageable and disengageable positive coupling elements adapted to be operated so as to couple or uncouple said members; means including companion friction clutch elements, respectively in driving connection with the respective members, one of said elements being movable into and out of frictional power transmitting contact with its companion prior to interengagement of the positive coupling elements; relatively rotatable camming means arranged to cooperate with one of said members and said movable friction clutch element, the arrangement being such that when the friction clutch surfaces are in frictional contact, one with the other, relatively faster movement of said one member causes a relative rotation of the camming elements to augment the friction between said friction surfaces, and control means for operating the positive coupling elements and initiating the camming action on the friction clutch, said control means having a part constructed and arranged positively and forcibly to disengage the camming means prior to interengagement of the positive coupling elements.

EARL A. THOMPSON.